(12) United States Patent
Muneta et al.

(10) Patent No.: US 7,430,451 B2
(45) Date of Patent: Sep. 30, 2008

(54) SAFETY UNIT, CONTROLLER SYSTEM, CONNECTION METHOD OF CONTROLLERS, CONTROL METHOD OF THE CONTROLLER SYSTEM AND MONITOR METHOD OF THE CONTROLLER SYSTEM

(75) Inventors: Yasuo Muneta, Kyoto (JP); Toshiyuki Nakamura, Kyoto (JP); Teruyuki Nakayama, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 830 days.

(21) Appl. No.: 10/478,515

(22) PCT Filed: May 31, 2002

(86) PCT No.: PCT/JP02/05390

§ 371 (c)(1),
(2), (4) Date: Jun. 3, 2004

(87) PCT Pub. No.: WO02/97543

PCT Pub. Date: May 12, 2002

(65) Prior Publication Data

US 2004/0210326 A1    Oct. 21, 2004

(30) Foreign Application Priority Data

May 31, 2001    (JP)    ............................. 2001-164565

(51) Int. Cl.
*G05B 11/01* (2006.01)
*G05B 11/02* (2006.01)
(52) U.S. Cl. .......................................... 700/21; 700/79
(58) Field of Classification Search .................. 700/21, 700/79
See application file for complete search history.

(56) References Cited

U.S. PATENT DOCUMENTS

| | | | |
|---|---|---|---|
| 3,803,974 | A | 4/1974 | Everest et al. |
| 4,625,308 | A | 11/1986 | Kim et al. |
| 4,715,031 | A | 12/1987 | Crawford et al. |
| 4,750,171 | A | 6/1988 | Kedar et al. |
| 5,059,953 | A | 10/1991 | Parsons et al. |

(Continued)

FOREIGN PATENT DOCUMENTS

EP    0905594 A1    3/1999

(Continued)

OTHER PUBLICATIONS

Asthana et al., US Statutory Invention Registration No. H1,882, Oct. 3, 2000, 18 Sheets.

(Continued)

*Primary Examiner*—Ronald D Hartman, Jr.
(74) *Attorney, Agent, or Firm*—Foley & Lardner LLP

(57) ABSTRACT

Safety units $1d$ to $1f$ for executing a safety function processing are connected to a non-safety controller constituted by connectting a plurality of units $1b$, $1c$ including CPU units $1a$. A CPU bus 10 to be connected with the CPU units and a safety dedicated bus 11 for mutually connecting the safety units are provided to the safety units. Since the safety dedicated bus is isolated from the non-safety system, reliability of the safety function can be secured. The CPU unit can read out data through the CPU bus irrespective of the safety unit and the non-safety unit.

7 Claims, 10 Drawing Sheets

U.S. PATENT DOCUMENTS

| | | |
|---|---|---|
| 5,130,716 A | 7/1992 | Kleiber |
| 5,157,780 A | 10/1992 | Stewart et al. |
| 5,206,835 A | 4/1993 | Beauducel |
| 5,218,680 A | 6/1993 | Farrell et al. |
| 5,282,127 A | 1/1994 | Mii |
| 5,400,018 A | 3/1995 | Scholl et al. |
| 5,519,607 A | 5/1996 | Tawil |
| 5,572,195 A | 11/1996 | Heller et al. |
| 5,598,566 A | 1/1997 | Pascucci et al. |
| 5,732,094 A | 3/1998 | Petersen et al. |
| 5,786,996 A | 7/1998 | Vitkus et al. |
| 5,841,654 A | 11/1998 | Verissimo et al. |
| 5,850,338 A | 12/1998 | Fujishima |
| 5,907,689 A | 5/1999 | Tavallaei et al. |
| 5,933,675 A | 8/1999 | Sawada et al. |
| 5,995,916 A | 11/1999 | Nixon et al. |
| 6,026,348 A | 2/2000 | Hala |
| 6,154,726 A | 11/2000 | Rensimer et al. |
| 6,347,252 B1 | 2/2002 | Behr et al. |
| 6,353,615 B1 | 3/2002 | Bohne |
| 6,353,867 B1 | 3/2002 | Qureshi et al. |
| 6,389,480 B1 | 5/2002 | Kotzur et al. |
| 6,473,811 B1 | 10/2002 | Onsen |
| 6,477,335 B1 | 11/2002 | Surya et al. |
| 6,507,804 B1 | 1/2003 | Hala et al. |
| 6,532,508 B2 | 3/2003 | Heckel et al. |
| 6,571,128 B2 | 5/2003 | Lebel et al. |
| 6,574,234 B1 | 6/2003 | Myer et al. |
| 6,577,918 B1 | 6/2003 | Roth |
| 6,640,268 B1 | 10/2003 | Kumar |
| 6,708,072 B2 | 3/2004 | Arima et al. |
| 6,762,684 B1 | 7/2004 | Camhi |
| 6,832,343 B2 | 12/2004 | Rupp et al. |
| 7,152,188 B1 | 12/2006 | Meyer-Grafe et al. |
| 2001/0037267 A1 | 11/2001 | Sato et al |
| 2002/0082060 A1 | 6/2002 | Kang et al. |
| 2002/0129033 A1 | 9/2002 | Hoxie et al. |
| 2003/0009610 A1 | 1/2003 | Nolan et al. |
| 2003/0037170 A1 | 2/2003 | Zeller et al. |
| 2003/0114288 A1 | 6/2003 | Harding et al. |
| 2003/0148760 A1 | 8/2003 | Takayanagi |
| 2004/0018817 A1 | 1/2004 | Kanayama et al. |
| 2004/0125821 A1 | 7/2004 | Kuhl |
| 2004/0181296 A1 | 9/2004 | Muneta et al. |
| 2004/0210323 A1 | 10/2004 | Muneta et al. |
| 2004/0210326 A1 | 10/2004 | Muneta |
| 2004/0210329 A1 | 10/2004 | Muneta et al. |
| 2004/0210620 A1 | 10/2004 | Muneta et al. |
| 2004/0215354 A1 | 10/2004 | Nakamura et al. |
| 2005/0017875 A1 | 1/2005 | Nakayama et al. |

FOREIGN PATENT DOCUMENTS

| | | |
|---|---|---|
| GB | 2 267 984 A | 12/1993 |
| GB | 2307068 A | 5/1997 |
| GB | 2 347 234 | 8/2000 |
| JP | 60-062482 | 4/1985 |
| JP | 03-116395 A | 5/1991 |
| JP | 04-045697 A | 2/1992 |
| JP | 05-37980 A | 2/1993 |
| JP | 5 37980 A | 2/1993 |
| JP | 6-324719 A | 10/1995 |
| JP | 7-282090 A | 10/1995 |
| JP | 08-211792 A | 8/1996 |
| JP | 11-24744 A | 1/1999 |
| JP | 2000-259215 A | 9/2000 |
| JP | 2000-269996 A | 9/2000 |
| JP | 2001-83002 A | 3/2001 |
| JP | 2001-084014 A | 3/2001 |
| JP | 2002-71519 A | 3/2002 |
| JP | 2002-73121 A | 3/2002 |
| WO | WO-99/67690 | 12/1999 |
| WO | 02/098065 A1 | 12/2002 |

OTHER PUBLICATIONS

Asthana et al.; US Statutory Invention Registration No. H001,882; Asthana et al.; Oct. 03, 2000.

FIG. 3

CONSTRUCTION MANAGEMENT INFORMATION (A) HELD BY CPU

| SLOT NUMBER | ID | PRODUCT TYPE | SERIAL NUMBER |
|---|---|---|---|
| 1 | CPU | ABC-CPU01 | XXXX-XXXX |
| 2 | IN16 | ABC-IN16 | YYYY-YYYY |
| 3 | OUT16 | ABC-OUT16-X | ZZZZ-ZZZZ |
| 4 | S-RM | ABC-SRM01 | SSSS-SSSS |
| 5 | S-IN8 | ABC-SIN8 | KKKK-KKKK |
| 6 | S-OUT16 | ABC-SOUT16 | QQQQ-QQQQ |

FIG. 4

SAFETY SYSTEM CONSTRUCTION MANAGEMENT INFORMATION (B)
HELD BY SAFETY UNIT (1)

| SLOT NUMBER | ID | PRODUCT TYPE | SERIAL NUMBER |
|---|---|---|---|
| 1 | S-RM | ABC-SRM01 | SSSS-SSSS |
| 2 | S-IN16 | AB-SIN16 | KKKK-KKKK |
| 3 | S-OUT16 | ABC-SOUT16-X | QQQQ-QQQQ |

FIG. 5

IO INFORMATION OF DEVICE ON NW (C) HELD BY SAFFETY UNIT (1)

| NODE ADDRESS | IN/OUT | DATA SIZE | ADDRESS |
|---|---|---|---|
| 1 | IN | 8 | CIO0 |
| 2 | IN | 16 | CIO1 |
| 3 | IN | 16 | CIO2 |
| 4 | OUT | 8 | CIO4 |
| 5 | OUT | 8 | CIO5 |

FIG. 6

IO INFORMATION (D) HELD BY SAFETY UNIT (2)

| ADDRESS | STATE |
|---|---|
| CIO10-0 | 1 |
| CIO10-1 | 0 |
| CIO10-2 | 0 |
| CIO10-3 | 1 |
| CIO10-4 | 1 |
| CIO10-0 | 0 |
| CIO10-0 | 0 |
| CIO10-0 | 0 |

SAFETY UNIT, CONTROLLER SYSTEM, CONNECTION METHOD OF CONTROLLERS, CONTROL METHOD OF THE CONTROLLER SYSTEM AND MONITOR METHOD OF THE CONTROLLER SYSTEM

This is a National Stage Application of International Application Number PCT/JP02/05390 filed May 31, 2002 (now published as WO 02/097543 published Dec. 5, 2002), which claims priority to Japanese Application Number 2001-164565 filed May 31, 2001, and is herein incorporated in its entirety by reference.

TECHNICAL FIELD

This invention relates to a safety unit, a controller system, a connection method of controllers, a connection method of the controllers, a connection method of the controller system and a monitor method of the controller system.

BACKGROUND ART

A programmable controller (hereinafter called "PLC") used in FA (Factory Automation) performs control by acquiring ON/OFF information from input devices such as switches and sensors connected to the PLC, executes a logic operation in accordance with a sequence program (user program) written in a ladder language and outputs ON/OFF information to a relay output connected to the PLC or a signal of driving/stop information to output devices such as valves and actuators on the basis of the operation result. Such control of the PLC is executed while a so-called "cyclic processing" is repeated.

Connection forms between the PLC and the input devices and between the PLC and the output devices are made through connection of terminals of the PLC and terminals of I/O units in some cases and through a network in other cases. To build up a network system connected through such a network, the exchange of the ON/OFF information described above is made through the network. At this time, the information is generally transferred by a master-slave system in which the PLC side is a master and the device side is a slave. This master-slave system is also referred to as a "remote I/O system", and uses a communication master unit provided to the PLC and a communication slave unit connected to the communication master unit through a network line. A plurality of input devices or a plurality of output devices is connected to the terminals of the communication slave unit. Communication between the master and the slave is made in a predetermined cycle in a serial communication transfer form. In the data transfer, the master raises a data request to the slave. Receiving this request, the slave converts ON/OFF information (I/O information) of each input or output device connected to the slave to a serial signal and returns it. In other words, the master controls communication right of the network and the slave executes the transfer processing to the network in accordance with control of the communication right. Incidentally, communication between the master and the slave may be conducted either synchronously or asynchronously with the cyclic processing of the PLC. The information exchange between a CPU of the PLC and the master may be conducted by either an I/O refresh processing of the PLC or a peripheral processing. Mutual communication can also be made by connecting a plurality of slaves to one master.

On the other hand, control by the PLC has been assumed in recent years for the application in which safety is highly required such as in robot machines, press machines, cutting machines, and the like, too. In robot control, for example, PLC control has now been introduced gradually into systems called a "safety system" and a "safety net system" lest a robot arm comes into contact with a human body and invites injury due to an abnormal operation or failure of the control system. In such a case, the safety system or the safety net system is constituted by the PLC as an element of the control system, each device or apparatus itself and a network incorporating a safety function. Here, the term "safety function" means the function that confirms safety and outputs. The term "safety system" means the function that doubles CPU and other processing portion, for example, and reliably brings a machine system into a safe condition or compulsively lets the machine system operate stop under a safe condition as a fail-safe operation when each processing portion judges abnormality by detecting inequality between the CPU and each processing portion, or when any abnormality (failure of normal communication) occurs in the network for some reasons or other, or when the operation enters a danger state as an emergency stop switch of the machine system is pushed or when a multi-axis photoelectric sensor detects a danger condition as a person (or a part of the body) enters a light curtain. In other words, the safety system outputs the signal and operates the machine only when the safety function stores safety. Therefore, when safety is not confirmed, the machine stops.

To build up the safety system or safety network system having the safety function described above, it has been necessary that devices to be connected to the network (PLC, slave, devices connected to the slave, etc) are all those having the safety function. For, when even one device not having the safety function is assembled in the system, the failsafe function does not operate in the control including that device and in the data communication with that device, so that the safety function of the overall system cannot be guaranteed.

In the control by the PLC, the overall system does not always require the safety function but the safety system must be used when even a part of the system needs guarantee of the safety function. In consequence, those devices that do not have the safety function cannot be included in the system. Then, the safety PLC and the safety devices are used for the portions that do not originally need the safety function. Because the devices having the safety function are more expensive than ordinary devices, the cost of the overall system becomes higher.

When an attempt is made to later introduce additionally and partially the devices having the safety function and the safety PLC into the environment in which the network system is constituted on the basis of the conventional PLC not having the safety function, or to allow the devices having the safety function to coexist with the conventional existing facilities, the attempt does not prove successful. In other words, the existing portions not having the safety function and the portions having the safety function must be isolated completely and they cannot coexist under the same environment. It is of course possible to discard the existing facilities and to install afresh a safety network system but a large number of replacement steps will be necessary.

On the other hand, there is a desire to constitute a safety network for only those portions that require the safety function in view of the explanation given above. However, because the safety system and the non-safety system are to be isolated as described above, the data exchange between both systems becomes difficult. Further, because the network systems of both safety system and non-safety system are arranged independently and in parallel, two kinds of setting/management tools become necessary and must be used appropriately, and the operation becomes complicated.

In view of the problems described above, the invention aims at accomplishing a controller under the state where a safety system and a non-safety system coexist satisfactorily, and providing a safety unit a controller system, a connection method of controllers, a control method of the control system and a monitor method of the controller system in which those portions that can be handled as a common processing between the safety system and the non-safety system are made in common with each other, while a safety function of the safety system can be guaranteed.

DISCLOSURE OF THE INVENTION

To accomplish the object described above, a safety unit according to the invention can be connected to a non-safety controller constituted by connecting a plurality of non-safety units including CPU units and executes a safety function processing. The safety unit includes a CPU bus for the connection with the CPU units and a safety dedicated bus for the connection with other safety units.

As another solution means, the invention provides a safety unit that can be connected to a non-safety controller constituted by connecting a plurality of non-safety units including CPU units, includes a CPU bus for the connection with the CPU units and a processing portion for executing a safety function processing and transmission/reception of data are made with the CPU units through the CPU bus.

Incidentally, examples of the safety unit include a safety controller, a safety bus master, a safety I/O and a combination of their functions. The safety dedicated bus corresponds to a safety dedicated bus 11 in a mode for carrying out the invention. In other words, the term "safety dedicated bus" represents a bus for exchanging information (data) for accomplishing the safety function processing, and only the safety units are connected to this bus. However, the safety dedicated bus may be used for exchanging other non-safety information so long as a closed world can be constituted inside the safety unit. What is hereby necessary is that the safety dedicated bus cannot be directly accessed from the non-safety units. The term "safety function" represents a so-called "failsafe function". It is the function that stops control when any abnormality occurs in the control operation of the controller or in communication and lets output-associated devices and control devices keep a stable condition by stopping the controller. The safety function also prevents control itself from getting uncontrollable. Examples of the cases where the control stop becomes necessary include the case where each processing portion of the controller such as a CPU is duplexed and inequality is detected there between, the case where any abnormality occurs in the network for some reasons, the case where an emergency stop switch of the machine system is pushed and the case where a multi-optical axes photoelectric sensor such as a light curtain detects a danger condition as a person (or a part of the body) enters. In these cases, the safety function lets a machine system as the control object reliably operate under a safety condition, or stops the machine system in addition to this safe operation, or the failsafe function operates to compulsively stop the machine system under the safe condition.

The invention can secure reliability of the safety system because the invention installs the safety dedicated bus. In other words, even when the non-safety unit and the safety unit are allowed to coexist by connecting the non-safety units constituting the non-safety system to the safety units, the invention can ensure reliability because at least the data for executing the safety function processing uses the safety dedicated bus.

The invention can thus constitute the controller in which the non-safety system and the safety system coexist. Consequently, the invention can achieve saving of the space and can manage the safety unit as a high functional unit of the controller (PLC) of the non-safety system.

The invention prepares suitable units (safety units) for those portions that require the safety function and those portions not requiring it, respectively, connects them together, can achieve appropriate installation at appropriate positions and can restrict an unnecessary rise of the cost. When the controller of the non-safety system has already been installed, the safety units according to the invention are connected to the existing controller and only the system requiring the safety function can be replaced to thereby utilize effectively the existing facilities and recourses. Accordingly, the safety system can be easily added into the environment that has already used the controller (PCL) of the non-safety system.

Preferably, safety system construction management information memory means for storing safety system construction management information is provided and a master function for managing and collating all the safety units is provided. In the mode for carrying out the invention, the master function can be accomplished by MPU 12 of a safety unit id. This safety unit operates as a master that manages the exchange of data between the safety units when a plurality of safety units is connected to one another. In this Instance, it is preferred that setting means for setting a safety unit being or not being the safety unit (master), among the plurality of safety units, that mainly controls the safety system is set is provided. In the mode for carrying out the invention, the setting means corresponds to a user interface 21. When such a setting means is provided, it becomes easy for a user to set a safety unit as the master among the safety units or to later confirm which safety unit is set as the master.

Further, a tool interface can be provided, and a function of acquiring information stored in other safety units or in the non-safety units through the CPU bus in accordance with the request from a connected tool may be provided.

The controller system according to the invention can be constituted by connecting the safety units of each invention described above to the non-safety controller constituted by connecting a plurality of non-safety units including the CPU units. In this case, the CPU unit can preferably read out the data through the CPU bus described above irrespective of the safety units and the non-safety units.

According to the invention, the CPU bus controlled by the CPU unit is provided to all of the safety units. Therefore, the CPU unit can read out the data through the CPU bus irrespective of the safety units and the non-safety units. On the contrary, the safety units can read the data of the non-safety units through the CPU unit.

Therefore, when the tool is connected to the CPU unit, constituent information of not only the units of the safety system but also of the units of the non-safety unit can be acquired. Similarly, when the tool is connected to the safety unit, constituent information of not only the units of the safety system but also of the units of the non-safety unit can be acquired.

Next, a connection method of the non-safety controller and the safety controller according to the invention will be explained. Each of a plurality of safety units constituting the safety controller is connected through the safety dedicated bus so that information can be exchanged among the safety units. In addition, the CPU bus of the non-safety controller is connected to each safety unit of the safety controller. In this instance, the CPU bus is branched to each safety unit (so-called "multi-drop"). In other words, the CPU bus is extended and connected to the safety controller. Transmission and reception of the data and exchange of information can be made between the CPU unit of the non-safety controller and the safety unit through this CPU bus.

In a control method according to the invention, the non-safety controller and the safety controller are constituted as a controller system and the CPU bus of the non-safety controller is extended and connected to the CPU unit of the safety controller. In this instance, the safety units other than the CPU unit of the safety controller may also be connected. To control the non-safety controller, the non-safety controller inputs I/O information for safety control that is handled by the safety controller through the CPU bus in addition to the exchange of the I/O information to each unit of the non-safety controller through the CPU bus. Furthermore, as the I/O information is exchanged with each safety unit through the safety dedicated bus as safety function control of the safety controller, the controller system is controlled.

Incidentally, when the non-safety controller inputs the I/O information for safety control, this I/O information may be acquired from an I/O information storage area of a system memory of the CPU unit of the safety controller (corresponding to system RAM 14 in the mode for carrying out the invention) or from an I/O information storage portion (corresponding to I/O information storage portion 22 of the mode for carrying out the invention) through the network. Incidentally, further, it is also possible to connect the CPU bus to other safety unit and to directly acquire the I/O information of the device connected to the safety unit or the I/O information stored by the safety unit without using the route of the safety CPU unit in place of the arrangement described above. When the I/O information for the non-safety controller is acquired and is used for control in the safety controller, the safety function cannot be guaranteed. Therefore, the information by the control of the non-safety controller is not acquired. To this end, the unit of the safety system (CPU unit or each unit) may reject the input of the control information from the unit of the non-safety system (controller, CPU unit) or the unit of the non-safety system may reject to output the control information to the safety system unit. In other words, the non-safety controller may inhibit transmission of the control information and the I/O information to the safety system unit on the basis of the construction management information.

In a controller system in which a non-safety controller and a safety controller are connected, a monitor method according to the invention involves the steps of connecting a tool to a CPU unit of the non-safety controller, acquiring the information held by the safety controller when the CPU unit of the non-safety controller receives a request from the tool and the CPU unit executes a processing corresponding to the request, and transmitting the information so acquired to an external tool. Needless to say, control information of the non-safety system can be similarly transmitted to the external tool. Thereafter, the tool side receives the transmitted information and displays the information on an accessorial monitor screen or executes logging recording of the transmitted information. In this way, it is possible to monitor the control information and the condition of the controller by use of the common tool to the non-safety system and the safety system.

The invention includes also a method that sets both non-safety controller and safety controller by use of a common tool. In a controller system which includes a non-safety controller and a safety controller, in which a CPU bus of the non-safety controller is extended and connected to the safety controller, and in which a CPU unit of the non-safety controller has a tool interface, the method of the invention connects a tool to the interface and lets the CPU unit of the non-safety controller execute a processing in accordance with the instruction from the tool to conduct predetermined setting to the safety controller through the CPU bus.

In the monitor method according to the invention, a tool is connected to a CPU unit of a safety controller, a safety CPU unit executes a processing in accordance with a request from the tool so connected, information held in the non-safety controller is acquired through a CPU bus and the information so acquired is transmitted to an external tool through the tool interface of the safety CPU unit. Incidentally, process steps may be added in which the safety CPU unit executes the processing in accordance with the request from the connected tool and the information held in the safety controller or the safety unit is acquired and is then transmitted to the tool.

Furthermore, the invention provides a setting method of a controller system in which a tool is connected to a CPU unit of a safety controller, and the CPU unit of the safety controller executes a processing in accordance with the instruction from the tool to conduct predetermined setting to a non-safety controller through a CPU bus. In this instance, since the CPU unit of the safety controller executes the processing, predetermined setting is made to the safety controller or the safety unit through the CPU bus or through a safety dedicated bus.

BRIEF DESCRIPTION OF THE DRAWINGS

FIG. 3 is a table showing an example of a data structure of a construction management information storage portion 16.

FIG. 4 is a table showing an example of a data structure of a safety system construction management information storage portion 25.

FIG. 5 is a table showing an example of a data structure of an I/O information storage portion 22.

FIG. 6 is a table showing an example of a data structure of an I/O information storage portion 23.

FIG. 7 is a flowchart useful for explaining a function of an MPU of a CPU unit 1a.

BEST MODE FOR CARRYING OUT THE INVENTION

To explain the invention in further detail, reference is to be had to the accompanying drawings.

Figure 1:
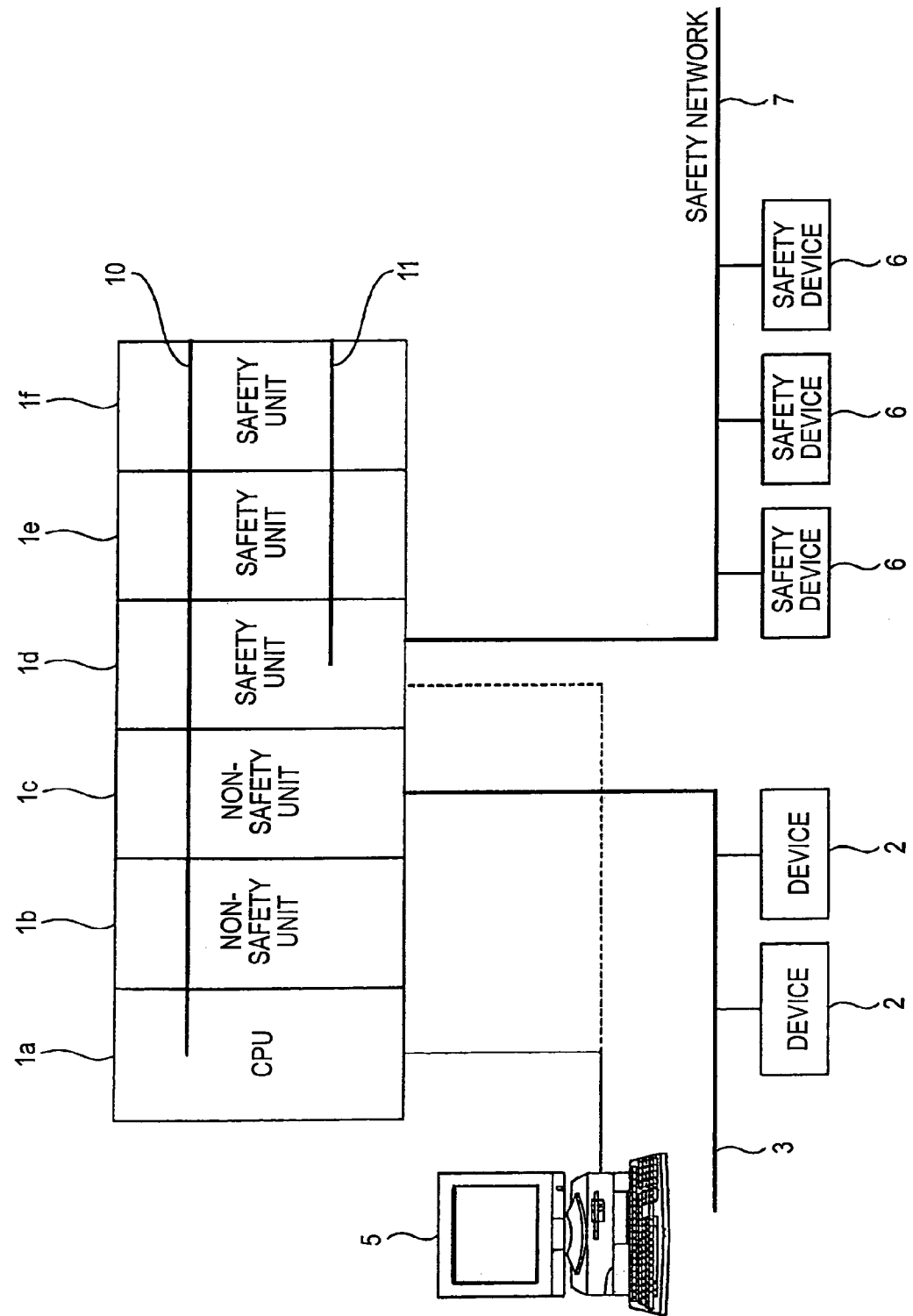
FIG. 1 is a diagram showing a safety network system according to a preferred mode for carrying out the invention.
Figure 2:
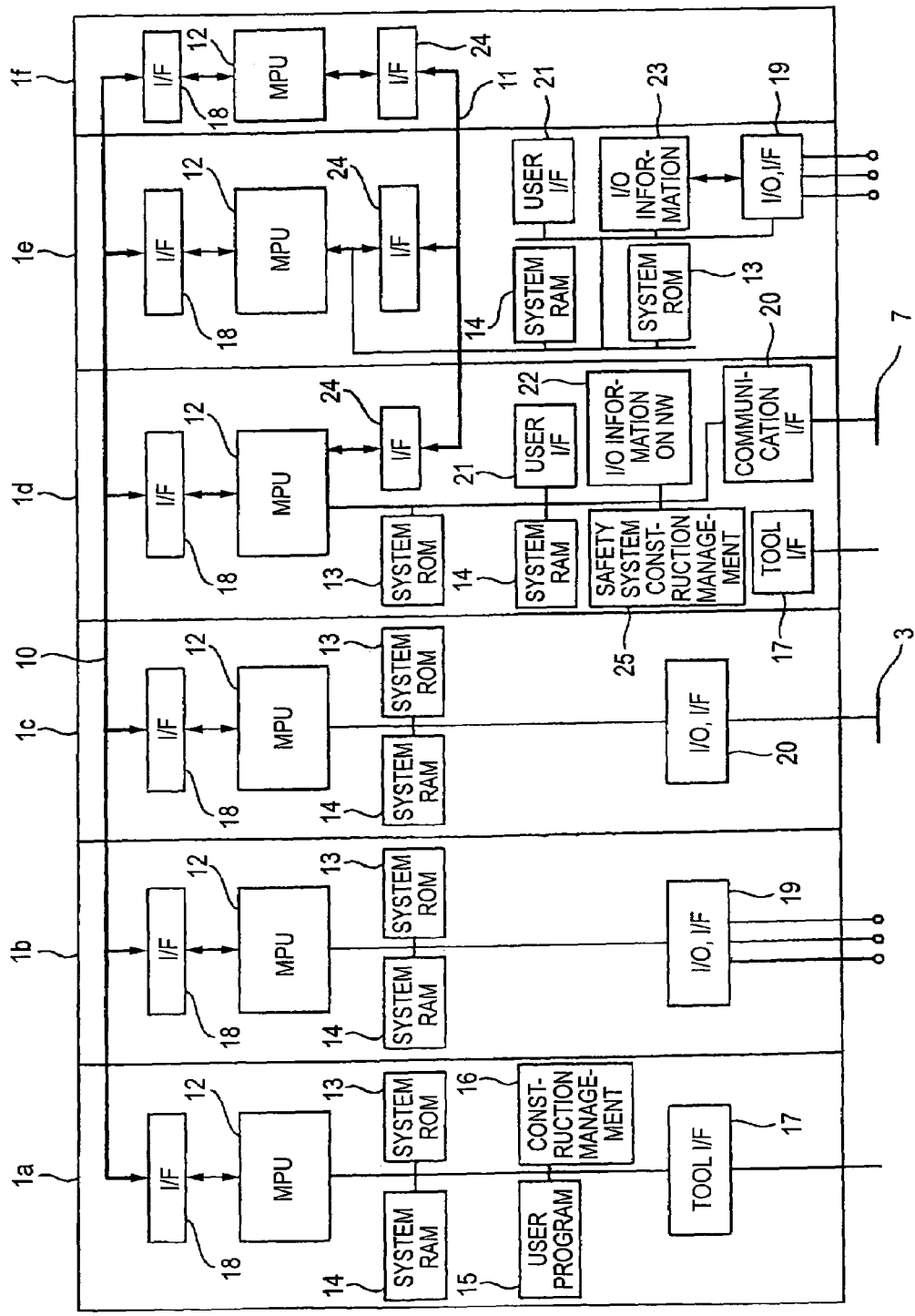
FIG. 2 is a diagram showing main portions of a controller (PLC) according to a preferred mode for carrying out the invention.
Figure 7:
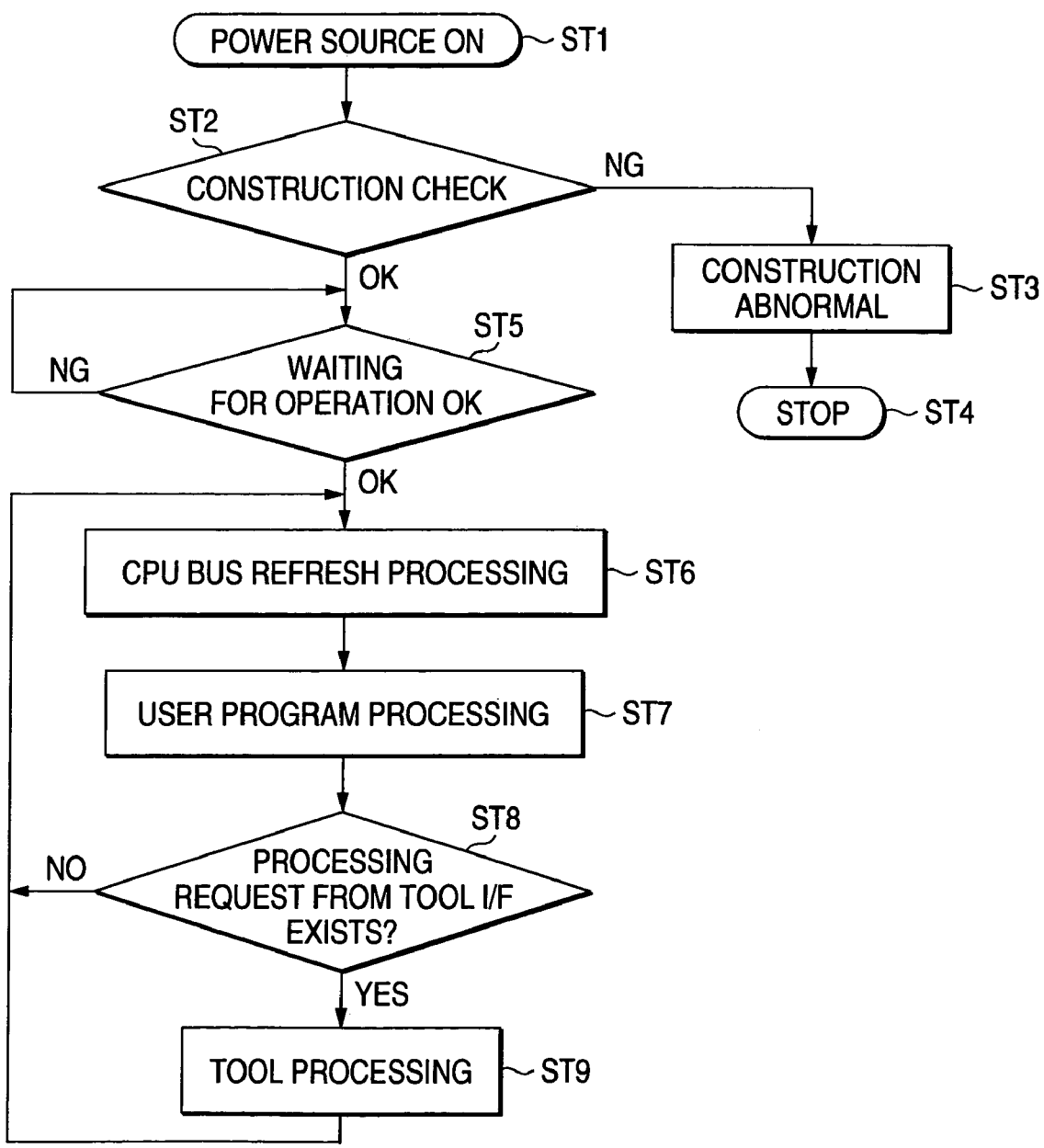

FIG. 1 shows an example of a network system to which the invention is applied. FIG. 2 shows an example of an internal construction of a PLC 1 as a controller. As shown in FIGS. 1 and 2, in this mode for carrying out the invention, the PLC 1 is constituted by connecting a plurality (six, in this case) of units 1a, 1b, 1c, 1d, and so on. Unlike the related art, the PLC 1 of this mode for carrying out the invention is constituted by connecting, under a mixed state, units (non-safety nits) for constituting a network system of a non-safety system not having a safety function and units (safety units) having a function of constituting a safety network system to one another.

More concretely, the network system includes three non-safety units 1a to 1c and three safety units 1d to 1f. The non-safety unit 1a is a so-called "CPU unit". The non-safety unit 1b is an I/O unit. The non-safety unit 1c is a communication master unit. A network 3 of the non-safety system is connected to the communication master unit 1c. Various devices 2 such as an input device and an output device are connected to the network 3. In consequence, the PLC 1 constitutes in cooperation with the devices 2 an ordinary non-safety network system that has been used in the past. The devices 2 execute serial communication with the communication master unit 1c and are called also "slave units". The CPU unit 1a executes a so-called "cyclic processing". The cyclic processing is the one that repeatedly executes an I/O refresh processing, a user program execution processing and a peripheral processing. The I/O refresh processing includes a processing that acquires ON/OFF information of the input device into a memory of the CPU portion of the PLC and a processing that outputs a signal of the execution result of the user program in the previous cycle to the output device. The input/output device is connected to the I/O unit 1b or to the device 2. The user program execution processing is the one that executes the operation on the basis of the input information from the input device in the light of the condition of the user program. The peripheral processing is the processing that executes communication through a network line connected to the PLC. The communication counter-part includes a tool, a higher order computer terminal and a slave of a remote I/O.

The safety unit 1d corresponds to a CPU unit capable of generalizing the units 1d to 1f having the safety function, and has a construction capable of achieving the safety function in addition to its cyclic processing function in the same way as the CPU unit 1a. A safety network 7 is connected to the safety unit 1d and safety devices 6 are connected to the safety network 7. Concrete examples of the safety devices 6 include input or output devices such as a light curtain sensor, a safety switch, a safety application actuator and the like. When the safety unit 1d has the communication master function, the safety devices 6 may be the slave units or the I/O terminals, and the remote I/O can be constituted by use of the safety network. The safety devices 6 include a plurality of input devices, output devices or input/output devices connected to one another and exchange the I/O information with the master through serial communication. The safety unit 1e corresponds to the safety I/O unit, can directly connect the safety devices (input devices or output devices) without passing through the network, acquires the input signal at the timing of the I/O refresh processing by the safety CPU unit 1d and outputs the output signal. The safety unit 1f operates as one of the safety units and includes a safety high function unit, a safety analog unit and a safety motion control unit, for example.

The CPU bus 10 is so extended as to cover all the units 1a to 1f as shown in the drawings. The CPU bus 10 is a communication bus line capable of exchanging the data with each unit. The CPU unit 1a of the non-safety system manages data exchange control in the CPU bus 10. In other words, the CPU unit 1a executes arbiter control for exchanging the bus right.

A safety dedicated bus 11 that is independent of the CPU bus 10 is so extended as to cover the safety units 1d to 1f and the safety units are connected to one another through the bus. The exchange of the safety data among the safety units 1d to 1f is made through the safety dedicated bus 11. The CPU unit 1a cannot control the bus right of this safety dedicated bus 11 but any one of the safety units 1d to 1f does the bus right control. Incidentally, any one of the units may have the bus master function.

In other words, because the CPU bus 10 for connecting all the units 1a to 1f and the safety dedicated bus 11 for connecting the safety units 1d to 1f are arranged separately from each other, communication can be made by using the CPU bus 10 when it is desired to mutually exchange the data of the units of the non-safety system and the data of the units of the safety system, among a series of PLC. For example, it is possible to pass the I/O information of the safety unit 1d to the CPU unit 1a and various setting information of the safety unit group held by the safety unit 1d to the CPU unit 1a and to hand over various setting information from the CPU unit 1a to the safety units 1d to 1f. Incidentally, it is not advisable to hand over the I/O information of the CPU unit 1a to the safety units. For, when the I/O information not having the safety function mixes into the safety devices, the safety devices are likely to fail to secure the safety function.

On the other hand, as to the data associated with safety for which the safety function is to be secured, communication can be made inside a closed world by use of the safety dedicated bus 11. In other words, the exchange of the data for executing the safety function can be made reliably inside the safety units 1d to 1f and the safety function such as failsafe can be reliably accomplished. In short, this mode for carrying out the invention employs the construction in which the safety system and the non-safety system coexist by use of a series of PLC and are provided with the mutually independent relation.

Because the tool 5 can be connected to the PLC 1, it is possible to create or edit the user program by use of the tool 5 and to down-load the program to the PLC1, or to collect the information of the network system stored in the PLC1. The collection information includes further construction management information of the PLC, the I/O information (control condition of each contact, etc), the I/O information of each unit, the condition of each input contact, the condition of each output contact, the I/O data of the CPU unit, information of a buffer memory of the I/O unit, etc), setting information of each unit (initial setting information, node number, communication setting of the communication unit, etc), safety information (I/O information of the safety unit, operation time information of each unit, life information, abnormal history information, etc) and construction management information of each unit.

Next, a concrete construction of each unit will be explained. To begin with, the non-safety unit 1a operates as the CPU unit 1a in this mode for carrying out the invention and executes control for the non-safety system. In other words, the non-safety unit 1a executes the user program created by a ladder, or the like, operates as the master of the CPU bus 10 and manages the overall construction of the PLC 1. This CPU unit 1a executes the so-called cyclic processing as described already and repeatedly conducts the I/O refresh processing, the user program execution processing and the peripheral processing.

To execute such processing, the MPU 12 reads out the system program stored in a system ROM 13 and further the user program stored in a user program storage portion 15 while using appropriately a memory area (I/O information storage area) of a system RAM 14. Further, the system further includes a construction management information storage portion 16 that stores information about all units constituting the PLC 1 (construction management information) and manages the overall construction on the basis of the construction management information so stored. As a data structure, the construction management information storage portion 16 has a table in which slot No., ID, product types and serial No. are associated with one another as shown in FIG. 3. The slot No. is the number serially allocated to each unit connected. The ID is the information for specifying the kind. As can be clearly seen from the drawing, the slot No. is allocated to all the units 1*a* to 1*f* irrespective of the safety system and the non-safety system. This construction management information is used when various items are set from the tool 5 to each unit 1*a* to 1*f*.

Each unit further includes a tool interface 17. When the tool 5 is connected to this tool interface 17, it becomes possible to down-load the user program, to collect the information and to conduct setting to the PLC 1. The MPU 12 connected to the tool interface 17 through the internal bus is connected to the CPU bus 10 through an interface 18 so that the tool 5 and each unit 1*b* to 1*f* can transmit and receive the signal. For example, the tool side 5 specifies a unit as a setting object by the slot number (corresponding to the unit number) and the tool side 5 inputs the setting information of the specified unit and down-loads the setting information to the specified unit. This down-load operation reaches each unit through the route including the tool 5, the tool interface 17, the MPU 12, the interface 18 and the CPU bus 10.

Each non-safety unit 1*b*, 1*c* executes the non-safety function. The MPU 12 is connected to the CPU bus 10 through the interface 18 and exchanges the data with the CPU unit 1*a*, etc. The MPU 12 gains access to the system ROM 13 and to the system RAM 14 and executes a predetermined processing for accomplishing the function of each unit.

In this mode for carrying out the invention, the non-safety unit 1*b* is an I/O unit of the non-safety system having an I/O interface 19. A predetermined I/O device is directly connected to this I/O interface. The non-safety unit 1*c* is a communication unit of the non-safety system having a communication interface 20. Therefore, the communication interface 20 of this non-safety unit 1*c* (communication unit) is connected to the network 3 and constitutes the network system of the non-safety system together with the devices 2 connected to the non-safety system network 3.

Incidentally, this non-safety system network system is the network system using the PLC that has generally been used in the past, and is referred to as the "non-safety system". The content of this system is well known. The system is sometimes existing equipment.

On the other hand, each safety unit 1*d* to 1*f* executes the safety function and is connected to the safety dedicated bus 11. Only these safety units 1*d* to 1*f* are connected to the safety dedicated bus 11. The safety dedicated bus 11 is suitable for accomplishing the safety function and is disposed independently of the CPU bus 10 of the related art. Furthermore, the safety units 1*d* to 1*f* are connected to the CPU bus 10, too, and can exchange the necessary data with the non-safety units through the CPU bus 10. To accomplish each function, each safety unit 1*d* to 1*f* includes an MPU 12, a system ROM 13 storing a program for execution of the MPU 12 and a system RAM 14 used during the operation. Each MPU 12 is connected to the CPU bus 10 through the interface 18 and to the safety dedicated bus 11 through the safety interface 24.

One of a plurality of safety units 1*d* to 1*f* operates as the master (indicated by reference numeral 1*d* in the example shown in the drawing) of the safety dedicated bus 11 and stores the construction management information of the safety units 1*d* to 1*f* in the safety system construction management information storage portion 25. FIG. 4 shows an example of the data structure of the safety system construction management information storage portion 25.

As can be clearly understood by comparing FIG. 4 with FIG. 3, the kind of the information stored is the same (slot No., ID, product types, serial No.). Whereas the information to be stored in the construction management information storage portion 16 shown in FIG. 3 is the construction management information of all the units, the safety system construction management information shown in FIG. 4 includes information of only the safety units 1*d* to 1*f* constituting the safety system and is therefore different. The slot number (safety slot No.) is allocated afresh. In other words, the slot No. is "4" and the safety slot No. is "1" for the safety unit 1*d*. Similarly, the slot Nos. are "5" and "6" and the safety slot Nos. are "2" and "3" for the safety units 1*e* and 1*f*, respectively.

The safety unit 1*d* includes a tool interface 17 and a communication interface 20 and can be connected to the tool 5 and to the safety network 7 through these interfaces. The safety unit 1*d* makes serial communication with the safety devices 6 connected to the safety network 7, acquires the I/O information of each safety device 6 and stores it in the I/O information storage portion 22. The data structure of this I/O information storage portion 22 is shown in FIG. 5. In other words, the safety unit 1*d* corresponds to a communication master unit of the remote I/O and can exchange the data with devices (input devices such as switches and sensors and output devices such as actuators) at remote places through the safety network as the safety devices 6 equivalently operate as the communication slave. Incidentally, the safety device 6 may by itself be one input device or one output device and each device may have interface means for directly outputting the data to the network 7. Further, one safety device 6 may be the device to which a plurality of input or output devices is connected and may be a so-called "slave unit" or a "terminal unit". In this case, signals are transmitted to, or received by, the network by conducting mutual parallel/serial conversion of the I/O information of a plurality of devices.

Further, a user interface 21 is provided to the safety unit 1*d*. The user interface 21 has various switches for conducting various kinds of setting. For example, the user interface 21 conducts setting as to whether or not the safety unit is the master unit. Incidentally, the safety unit 1*d* is the master of the safety system and constitutes the communication unit, too. These functions may be separated and may be constituted into separate units.

Each of the safety unit 1*e* and the safety unit 1*f* has the CPU 10 and the safety dedicated bus 11, and the MPU 12 is connected to each bus 10, 11 through the interface 18 and through the safety interface 24. Further, the safety unit 1*e* constitutes the I/O unit. In other words, the safety unit 1*e* has an I/O interface 19, acquires safety information of the I/O safety devices connected to this I/O interface 19 and stores the safety information into the I/O information storage portion 23. FIG. 6 shows an example of the data structure in the I/O information storage portion 23. The MPU 12 executes the exchange of the date with these safety devices, storage of the data into the I/O information storage portion 23 and other processing while gaining access to the system ROM 13 and to the system RAM 14.

Next, the function of the MPU 12 provided to the CPU unit 1*a* as the master of the non-safety system will be explained. First, when the power source is made (ST1), the construction management information and the actual unit are checked to judge whether or not they are coincident (ST2). In other words, whether or not each unit (safety system and non-safety system) connected to the CPU bus 10 is correctly connected is judged. In the case of inequality, construction abnormality is judged, and the operation is stopped (ST3, ST4).

When the result of the construction check proves OK, on the other hand, an operation start instruction is awaited (ST5), and the operation shifts to the ordinary cyclic control operation when the start instruction is received. In other words, the refresh processing of the CPU bus is first executed (ST6). This processing is referred to as "I/O refresh" and is a processing that rewrites the I/O data stored in the system RAM 14 of the CPU unit 1a and in the system RAM 14 of other units 1b, 1c (1d to 1f, whenever necessary) and updates the I/O data to the latest I/O data. The user program is executed on the basis of the latest input data obtained by this I/O refresh processing (ST7). The execution result is written as the latest output data into the system RAM 14. The execution result is sent as the output data to other units at the time of the next I/O refresh processing. Whether or not the processing request from the tool interface of the CPU unit 1a exists is judged (ST8). When the request does not exist, the refresh processing and execution of the user program are repeatedly conducted. When the processing request exists from the tool 5 connected to the CPU unit 1a (Yes in ST8),the tool processing is executed. This processing is the peripheral processing described already. When the peripheral processing is finished or after the peripheral processing is executed for a predetermined time, the flow returns to Step 6. The ordinary cyclic execution processing is thereafter executed repeatedly. Examples of the peripheral processing are monitor (readout) of the I/O information and rewrite of the I/O information. The readout operation of the I/O information may be made either in the non-safety system or in the safety system but the write operation cannot be made for the safety system. Further, the unit may be allowed to fetch the user program and to read/update the construction management information. Incidentally, the peripheral processing will be later described, too.

The I/O information of the safety system may be used, whenever necessary, when the PLC processing of this non-safety system is executed by the CPU unit 1a. In such a case, I/O allocation is made as to the I/O information of which safety device connected to which safety unit is to be utilized on the basis of the construction management information. This I/O allocation associates the I/O information area in the system RAM 14 with the safety device described above. When this allocation is made, the MPU 12 of the CPU unit 1a acquires the I/O information of the safety device of a specific safety unit through the CPU bus 10. A more concrete method acquires the I/O information of each safety unit stored in the system RAM 14 provided to the safety unit 1d (corresponding to the CPU unit) or the data stored in the I/O information storage portion 23 of the device on the network by the processing of the MPU 12 of the CPU unit 1a through the CPU bus 10. Besides this method, the I/O information from the safety units 1e and 1f may be acquired.

Figure 8:
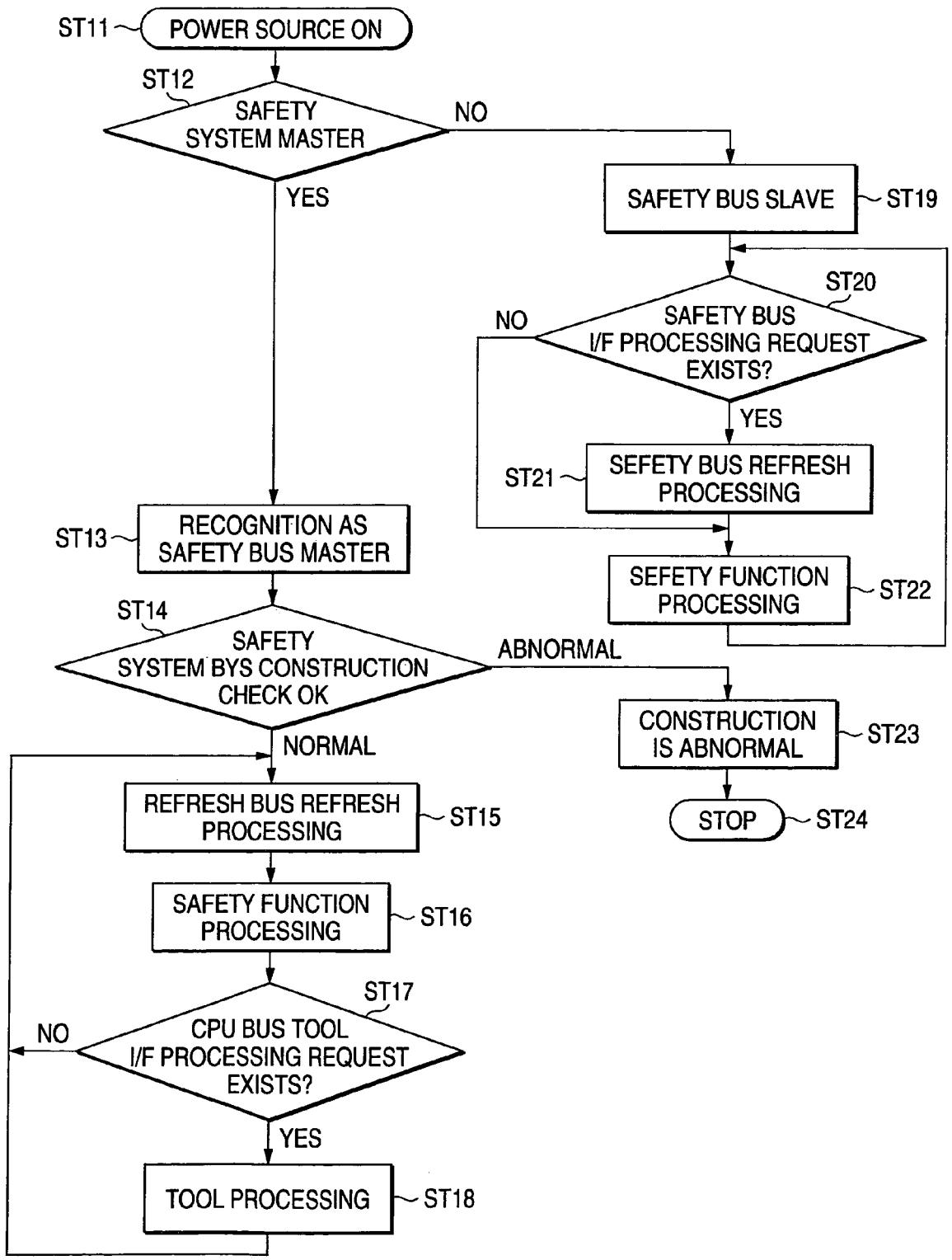
FIG. 8 is a flowchart useful for explaining a function of an MPU of a safety unit id as a master of a safety system.

Next, the function of the MPU 12 of each safety unit 1d to 1f will be explained. When the power source is made (ST11) as shown in FIG. 8, whether or not the unit is the safety system master is judged (ST12). This judgment is made on the basis of setting of the user interface 21. Incidentally, setting as to whether or not the unit is the safety system master is not made by using the user interface 21 but is made in the manner that the safety unit No. sets the safety system master to "1", for example, the branch judgment of Step 12 checks the safety system unit No.

In the case of the safety system master, the flow proves Yes in Step 12, and proceeds then to Step 13, where the unit is recognized as the safety bus master. The safety system construction management information and the actual unit construction are checked and whether or not they are coincident is judged (ST14). In other words, whether or not each safety unit 1d to 1f connected to the safety dedicated bus 11 is correctly connected is judged. In the case of inequality, the construction is judged as being abnormal and the operation is stopped (ST23, ST24).

On the other hand, when the bus construction of the safety system is found OK, the operation shifts to the ordinary cyclic control operation. In other words, the refresh processing of the safety dedicated bus 11 is executed (ST15). This execution exchanges the I/O data stored in the system RAM 14 of the safety master 1d and in the system RAM 14 of other units 1e, 1f and updates the latest I/O data. As a result of this processing, the safety master 1d acquires the input information from other units 1e, 1f to update the input information to the latest input information, hands over the output information to other unit and updates the output information on the side of the other unit to the latest output information. Next, the safety function processing is executed on the basis of the latest input data obtained by this I/O refresh processing (ST16). This safety function processing is the execution of the user program in the safety master 1d, processes a logic operation determined in advance in accordance with the input information and acquires the operation result as the output information for operating the safety devices. Next, the existence/absence of the processing request of the tool 5 is judged through the CPU bus 10 or from the tool interface of the safety unit 1d (ST17). When no request exists, the flow returns to the refresh processing of Step 15 and the ordinary cyclic processing is repeatedly executed. When the processing request exists from the CPU unit 1a or from the tool 5 connected to the safety unit 1d (Yes in ST17), the tool processing as the peripheral processing is executed and then the flow returns to Step 15 where the ordinary cyclic processing is executed. Incidentally, condition monitor of the safety devices or the overall safety system, for example, is sometimes carried out as the tool processing. The I/O information in the system RAM 14 of the safety master 1d may of course be rewritten through the tool. In such a case, password management must be made. Preferably, the tool processing executed through the CPU bus 10 is limited to the monitor and the safety device information, and the control information relating to the safety devices is not rewritable. For, the safety function cannot be secured when the information is acquired from the non-safety route and is used for the safety application from the aspect of the safety function processing.

The data exchange of the safety system will be explained. Transmission/reception of the data is made among the units 1d to 1f through the safety dedicated bus 11 and duplexing of the data transmission is made as the safety function at this time. It is preferred, for example, that the safety unit on the transmission side transmits twice the same data through the safety dedicated bus 11 and data fetch becomes effective only when the two data received by the safety unit on the reception side are coincident. According to another method, the safety unit on the transmission side passes actual data information and its processed signal (signal inverted digitally, for example) in one frame through the safety dedicated bus 11, coincidence of the actual data portion and a signal obtained by restoring the processed signal (signal that is again inverted digitally and is returned to state before inversion in this example) by the safety unit on the reception side and the reception data is handled as effective on condition of coincidence.

On the other hand, when the unit is not the safety system master (No in Step 12), the unit is recognized as the safety bus slave (ST19) and the existence/absence of the safety bus interface processing request is judged (ST20). When the request exists, the safety bus refresh processing is executed. After the predetermined data is responded to the safety system master, the safety function processing is executed (ST22). When the request does not exist, the safety function processing is as such executed.

Figure 9:
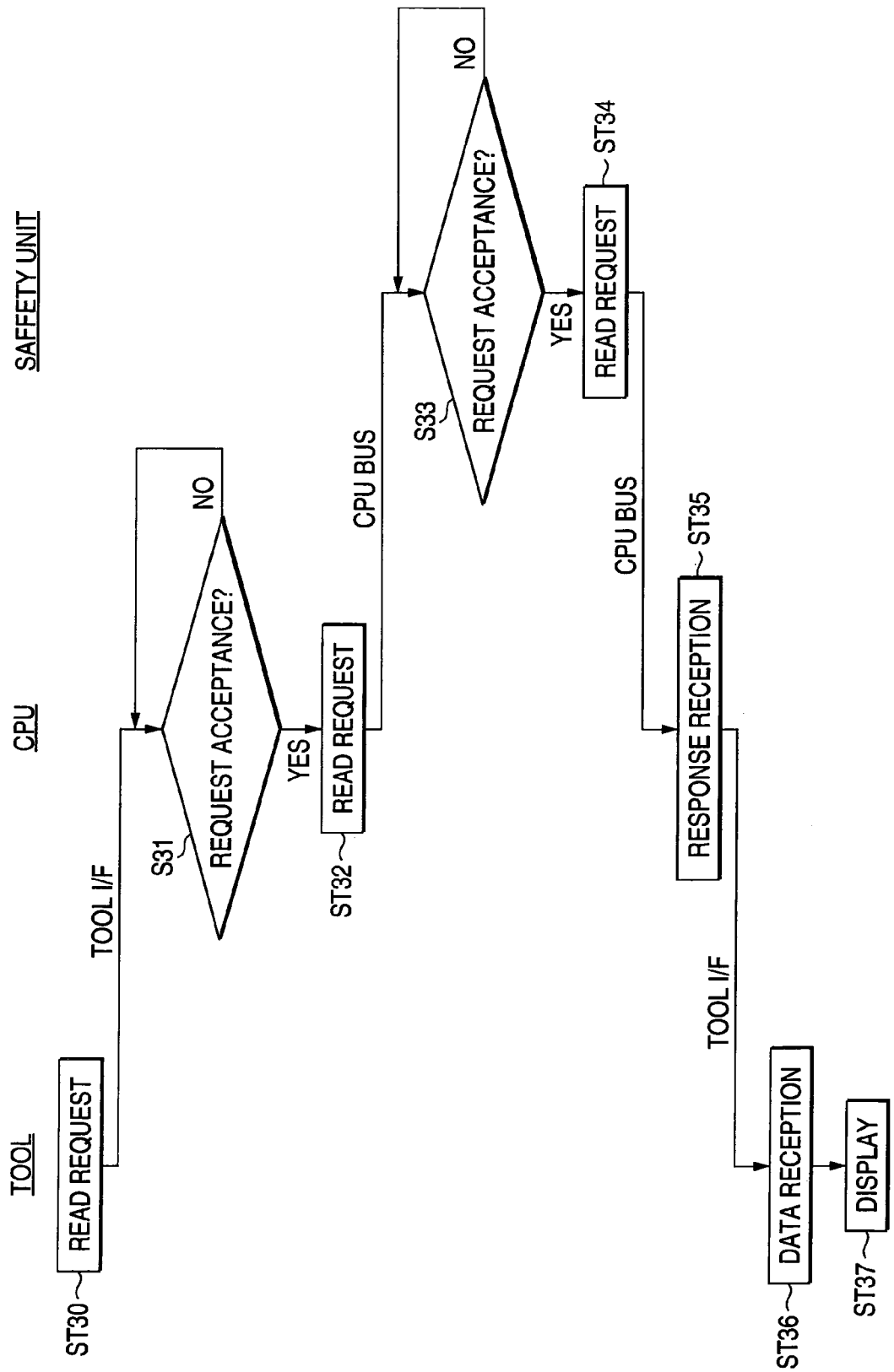
FIG. 9 is a flowchart useful for explaining an operation of an MPU of a CPU unit for collecting information held by a safety unit.

Next, the tool processing, that is, a call (acquisition) processing of the data stored in a different unit, will be explained. First, FIG. 9 shows a processing sequence for reading out the information held by the safety unit from the tool 5 connected to the CPU unit 1a. The information hereby read out is the safety system construction management information and the I/O information of devices on the network stored in the safety system construction management information storage portion 25 and in the I/O information storage portion 22, respectively, from the safety unit 1d as the safety system master, and the I/O information stored in the I/O information storage portion 23 from the safety unit 1e as the safety system I/O unit.

To begin with, the tool 5 generates the read request (ST30) The MPU 12 of the CPU unit 1a waits for such a request from the tool 5 (ST31), receives the request through the tool interface 17, analyzes the content of the request and generates the read request to the safety unit having the data to be read out (ST32). This read request is made through the CPU bus 10.

On the other hand, the MPU 12 of the safety unit waits for the request sent through the CPU bus 10, too (ST33), receives the request, reads out the information (data B & C, data D) that holds and manages by itself through the internal bus and transmits the information (data B & C, data D) so read out to the MPU 12 of the CPU unit 1a through the CPU bus 10 (ST34).

Receiving the response from the safety unit generating the request, the MPU 12 of the CPU unit 1a sends the data (B & C, D) so received to the tool 5 through the internal bus and through the tool interface 17 (ST35). In consequence, because the tool 5 can receive the data (B & C, D) (ST36), the received data is displayed on the monitor of the tool 5 (ST37).

It becomes possible to collect in this way the data held by the safety units of the safety system from the side of the CPU unit 1a of the non-safety system. Incidentally, the tool 5 connected to the CPU unit 1a can of course monitor the data held by the CPU unit 1a in the same way as in the related systems though its concrete circuit is not shown in the drawing.

Figure 10:
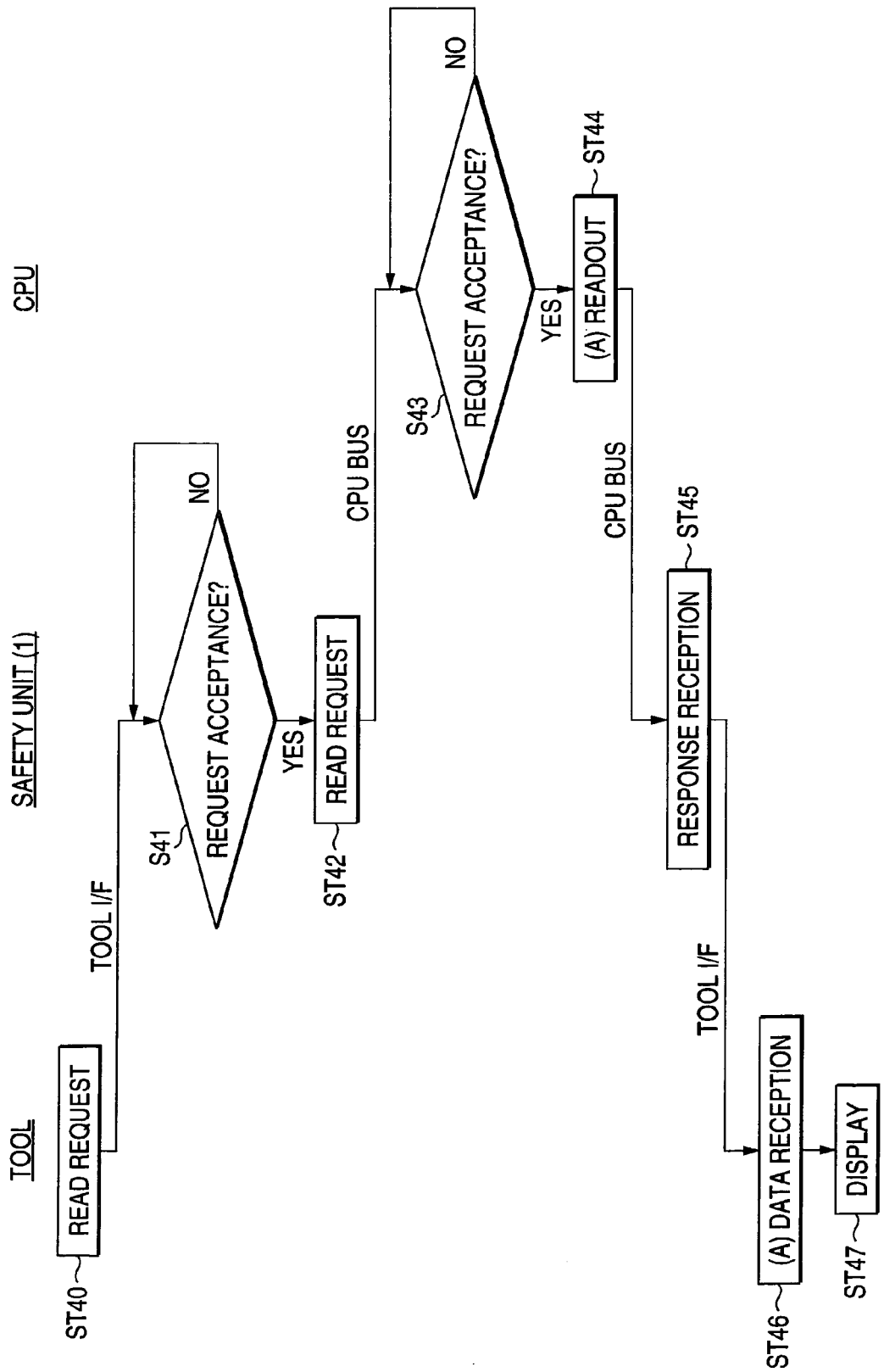
FIG. 10 is a flowchart useful for explaining an operation of an MPU of a safety unit for collecting information held by a CPU unit.

Next, the processing sequence for reading out the information (construction management information stored in construction management information storage portion 16: data A) held by the CPU unit 1a of the non-safety system from the tool 5 connected to the safety unit 1d as the master of the safety system will be explained. The tool 5 generates the read request as shown in FIG. 10 (ST40). The MPU 12 of the safety unit 1d waits for such a request from the tool 5 (ST41), receives the request (that specifies data to be read out) through the tool interface 17, analyzes the content of the request and generates the read request to the CPU unit 1a (ST42). This read request is made through the CPU bus 10.

On the other hand, the MPU 12 of the CPU unit 1a, too, waits for the request sent through the CPU bus 10 (ST43), receives the request and analyzes the content of the request. Judging that the request is the read request of the construction management information (data A), the MPU unit 12 holds by itself, the MPU 12 reads out the information (data A) managed and held by itself through the internal bus and transmits the information (construction management information) so read out to the MPU 12 of the safety unit 1d through the CPU bus 10 (ST44).

Receiving the response from the CPU unit 1a generating the request, the MPU 12 of the safety unit 1d sends the data received to the tool 5 through the internal bus and then through the tool interface 17 (ST45). Consequently, because the tool 5 can receive the information (data A) (ST46), the data received is displayed on the monitor of the tool 5 (ST47).

It is possible to collect in this way the data held by the CPU unit of the non-safety system from the side of the safety unit 1d of the safety system. The tool 5 connected to the safety unit 1d can of course monitor the data B&C held by the safety unit 1d in the same way as in the related systems though a concrete circuit is not shown in the drawing.

Figure 11:
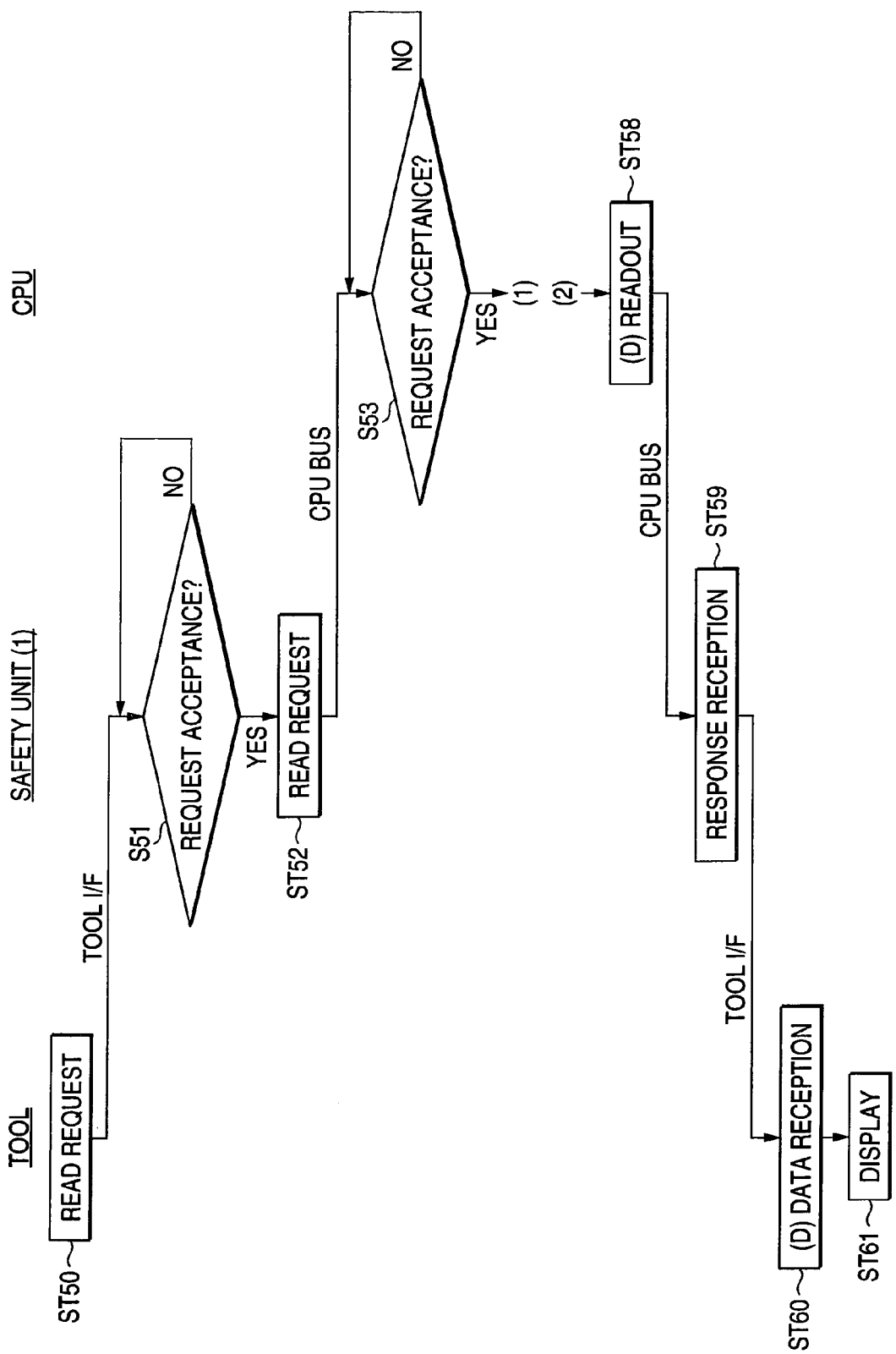
FIG. 11 is a part of flowchart useful for explaining an operation of an MPU of a safety master unit as a master of a safety system for collecting information held by other safety unit.
Figure 12:
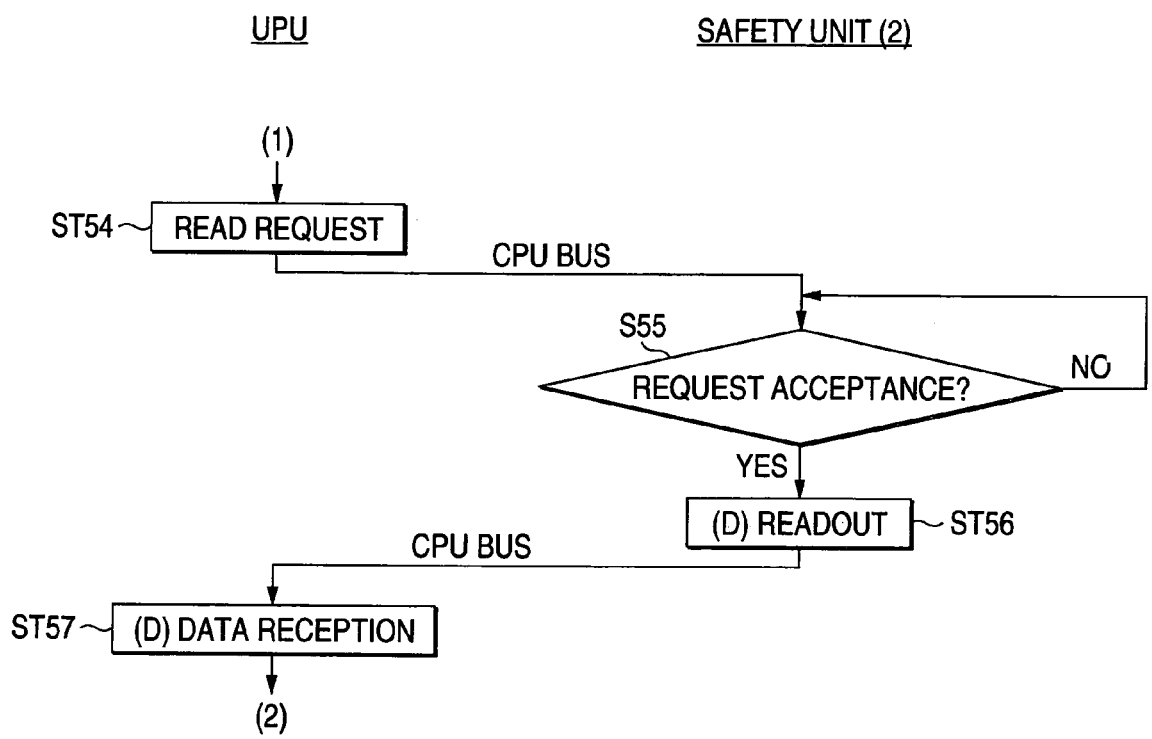
FIG. 12 is a part of flowchart useful for explaining an opration of an MPU of a safety master unit as a master of a safety system for collecting information held by other safety unit.

Furthermore, a sequence for reading out the data held by other safety units of the same safety system from the tool connected to the safety unit 1d will be explained. The tool 5 first generates the read request as shown in FIGS. 11 and 12 (ST50). The MPU 12 of the safety unit 1d waits for the request from the tool 5 (ST51), receives the request through the tool interface 17 and generates the read request to the CPU unit 1a (ST52). This read request is made through the CPU bus 10.

On the other hand, the MPU 12 of the CPU unit 1a, too, waits for the request sent through the CPU bus 10 (ST53), receives the request and analyzes the content of the request. Judging that the request is the read request of the I/O information (data D) held by the safety unit 1e of the unit No. 5, the MPU 12 generates the read request of the data D to the safety unit 1e through the CPU bus 10 (ST54).

The MPU 12 of the safety unit 1e waits for the request sent through the CPU bus 10 (ST55) in the same way as the read out from the tool connected to the CPU unit 1a described above, receives the request, reads out the information (data D) managed and held by itself through the internal bus and transmits the information (data D) so read out to the MPU 12 of the CPU unit 1a through the CPU bus 10 (ST56). Incidentally, it is not important for the MPU 12 of the safety unit 1e from which tool the request is generated. Therefore, the MPU unit 12 merely executes the processing of receiving the request from the CPU unit 1a and returning the necessary data.

Next, the MPU 12 of the CPU unit 1a transmits the data D received through the CPU bus 10 to the MPU 12 of the safety unit 1d that generates the basic read request through the CPU bus 10 (ST58).

Receiving the response from the CPU unit 1a, the MPU 12 of the safety unit 1d sends the data received to the tool 5 through the internal bus and then through the tool interface 17 (ST59). Consequently, because the tool 5 can receive the information (data D) (ST60), the data received is displayed on the monitor of the tool 5.

Needless to say, the MPU 12 of the safety unit 1d can directly acquire the data D from the safety unit 1e through the safety dedicated bus 11. According to the processing sequence described above, however, the data exchange among the units can be made through the CPU bus 10 and the safety dedicated bus 11 can be used desirably and exclusively for the exchange of the information for the safety processing function.

When the construction described above is employed, the safety units 1d to 1f can be managed as the high function of the PLC of the related art. Because these safety units can be integrated with the PLC of the non-safety system of the related art, only one unit is necessary for those units that can be used in common such as the power source unit and the space requirement can be saved. Furthermore, the safety system can be easily added to the environment that has already used the PLC of the non-safety system.

When bus connection is made by connecting the non-safety units $1a$ to $1c$ to the safety units $1d$ to $1f$, these units are connected and integrated both electrically and mechanically, whereby the wiring can be reduced. Therefore, wiring can be saved. Moreover, because the safety dedicated bus is provided, the processing of the safety system and the non-safety system becomes optimal (attains the highest speed) and reliability of the safety system can be secured due to the provision of the safety dedicated bus. Therefore, the safety system can be constituted relatively economically.

Because the CPU bus 10 capable of controlling the CPU (MPU 12 of CPU unit $1a$) of the PLC is provided to all the safety units $1d$ to $1f$, the MPU 12 of the CPU unit $1a$ can read out the data of all the units through the CPU bus irrespective of the safety units and the non-safety units. The safety units can read out the data of the non-safety units through the CPU units.

INDUSTRIAL APPLICABILITY

As described above, according to the invention, the CPU bus and the safety dedicated bus are disposed and only the safety units can gain access to the safety dedicated bus. Therefore, the invention can accomplish a controller in which the safety system and the non-safety system coexist. Transmission and reception of the data between the safety system and the non-safety system can be easily made by use of the CPU bus. When these systems are integrated, the space can be saved.

The invention claimed is:

1. A safety unit for executing a safety function processing, capable of being connected to a non-safety controller constituted by connecting a plurality of non-safety units including CPU units, comprising:
    a CPU bus for connecting said CPU units; and
    a safety dedicated bus for connecting other safety units.

2. A safety unit according to claim 1, further comprising a tool interface, and having a function of acquiring information held in the other of safety units or in said non-safety units through said CPU bus in accordance with a request from a tool connected.

3. A safety unit according to claim 1, further comprising setting means for setting a main safety unit for controlling a safety system among said plurality of safety units.

4. A controller system comprising:
    a non-safety controller constituted by connecting a plurality of units including CPU units through a bus; and
    a safety controller constituted by connecting a plurality of safety units including CPU units having a safety function through a bus separate from and independent of said bus;
    wherein said bus of said non-safety controller is connected also to said CPU units of said safety controller so that I/O information used for control in said non-safety controller can be inputted to or outputted from each unit of said non-safety controller through said bus and input information can be acquired from said safety units; and
    I/O information used for controlling the safety function in said safety controller is inputted to and outputted from each of said safety units through said independent bus but input information from said units of said non-safety controller through said bus is not accepted.

5. A controller system according to claim 4, wherein a tool device can be connected to the CPU unit of said non-safety unit so that data can be read out through said bus irrespective of said safety units and said non-safety units.

6. A method of connecting a controller constituted by connecting a plurality of units including CPU units through a CPU bus to a safety controller constituted by connecting a plurality of safety units including CPU units and having a safety function through an independent bus, comprising the steps of:
    connecting said plurality of safety units of said safety controller by extending the CPU bus of said controller and by using said CPU bus so extended; and
    exchanging data between said CPU units and said safety units through said CPU bus.

7. A method of controlling a controller system including a non-safety controller constituted by connecting a plurality of units including CPU units through a CPU bus and a safety controller constituted by connecting a plurality of safety units including CPU units and having a safety function through an independent bus, said controllers being connected by extending the CPU bus of said non-safety controller to the CPU units of said safety controller, wherein control in said non-safety controller is made by delivering I/O information to each of the units of said non-safety controller through said CPU bus and whenever necessary, by receiving input information from said safety controller through said CPU bus; and safety function control in said safety controller is made by delivering I/O information to each of the safety units through said independent bus but not by using information by control of said non-safety controller.

* * * * *